United States Patent
Caille et al.

[11] Patent Number: 5,999,144
[45] Date of Patent: Dec. 7, 1999

[54] TRANSMISSION RELAY SYSTEM

[75] Inventors: Gérard Caille, Tournefeuille; Claude Argagnon, Tournefuille, both of France

[73] Assignee: Alcatel, Paris, France

[21] Appl. No.: 08/972,262

[22] Filed: Nov. 18, 1997

[30] Foreign Application Priority Data

Nov. 21, 1996 [FR] France .................................. 96 14206

[51] Int. Cl.$^6$ .................................................. H01Q 21/00
[52] U.S. Cl. ........................................... 343/853; 455/12.1
[58] Field of Search .................................... 343/853, 754; 455/12.1, 20, 22, 427

[56] References Cited

U.S. PATENT DOCUMENTS 5,400,040  3/1995  Lane et al. .

FOREIGN PATENT DOCUMENTS

0405372A1  1/1991  European Pat. Off. .
0531877A1  3/1993  European Pat. Off. .
0624008A2  11/1994  European Pat. Off. .
2727934A1  6/1996  France .

Primary Examiner—Don Wong
Assistant Examiner—Shih-Chao Chen
Attorney, Agent, or Firm—Sughrue, Mion, Zinn Macpeak & Seas, PLLC

[57] ABSTRACT

A transmission relay system includes a receive antenna with first radiating elements, a transmit antenna with second radiating elements, and processing devices through which the first radiating elements and the second radiating elements are connected. The processing devices are in the form of processing systems all of which induce the same propagation time-delay. Each system connects a given first radiating element to a corresponding given second radiating element defined firstly by an angular position relative to a second axis of symmetry specific to the transmit antenna offset substantially 180° relative to an angular position of the given first radiating element relative to a first axis of symmetry specific to the receive antenna and parallel to the second axis of symmetry and secondly by an eccentricity in the transmit antenna which is a function of an eccentricity of the given first radiating element in the receive antenna.

13 Claims, 3 Drawing Sheets

TRANSMISSION RELAY SYSTEM

BACKGROUND OF THE INVENTION

1. Field of the Invention

The present invention concerns a transmission relay system, or re-transmitter unit, which receives a first signal on a first carrier frequency from a remote point to re-transmit on a second carrier frequency a second signal in the form of a beam covering a geographical area. The first and second carrier frequencies can be the same and the first and second signals modulating these two carrier frequencies can be the same signal.

The invention finds applications in satellite telecommunication systems, for example. Embodiments of the invention apply to a surveillance satellite system or a low altitude satellite system. The signal carried by the first carrier frequency is transmitted by a ground station to a satellite. A transmission relay system in the latter re-transmits a signal carried by the second carrier frequency.

2. Description of the Prior Art

One prior art solution uses beam forming networks (BFN) which adjust the phase of the signal produced by each radiating element to form a beam that is transmitted with a particular wavefront defining the orientation of the beam.

As shown in FIG. 1, in some satellite telecommunication networks at least one satellite 1 re-transmits each signal UP received from a base station 2 in the opposite direction to this received signal. Thus the satellite 1 is used as a relay to form a beam DOWN covering a geographical area centered on the base station from which it has received a signal. In such applications conventional beam forming networks can be used. This then implies complex processing on board the satellite for the application concerned.

A first objective of the invention is to remedy this drawback by providing a transmission relay system of low technical complexity for an application of the type limited to re-transmitting the received signal in the opposite direction.

A second objective of the invention is to provide a particularly advantageous transmit and receive antenna geometry.

SUMMARY OF THE INVENTION

To this end, the invention consists in a transmission relay system comprising receive antenna means provided with a plurality of first radiating elements, transmit antenna means provided with a plurality of second radiating elements, and processing means through which the first radiating elements and the second radiating elements are connected, wherein the processing means are in the form of processing systems all of which induce the same propagation time-delay, each system connecting a given first radiating element to a corresponding given second radiating element defined by an angular position relative to a second through axis of symmetry specific to the transmit antenna means offset substantially 180° relative to an angular position of the given first radiating element relative to a first through axis of symmetry specific to the receive antenna means and parallel to the second through axis of symmetry and by an eccentricity in the transmit antenna means which is a function of an eccentricity of the given first radiating element in the receive antenna means.

The processing systems advantageously include frequency transposition means.

In a first embodiment the transmit antenna means and the receive antenna means define respectively convex and concave part-spherical surfaces.

In a second embodiment the transmit antenna means and the receive antenna means define respectively convex and concave hyperboloidal surfaces. In this embodiment, a radiating element density decreases over at least a portion of at least one of the hyperboloidal surfaces in a direction away from an apex.

The surfaces defining the transmit antenna means and the receive antenna means are deduced from each other by geometrical similarity relative to a point with a ratio of similarity which is a function of the transmit frequency/receive frequency ratio.

In a further embodiment the second radiating elements of the transmit antenna means and the first radiating elements of the receive antenna means are supported by a common surface in a given alternating arrangement.

Other features and advantages of the present invention will emerge more clearly from a reading of the following description with reference to the corresponding accompanying drawings.

DETAILED DESCRIPTION OF THE PREFERRED EMBODIMENTS

In the following figures, only a few radiating elements are shown for each type of antenna proposed in order to illustrate the invention. The skilled person knows that in practise these radiating elements or patches are disposed in relatively large numbers to form each antenna.

Figure 1:
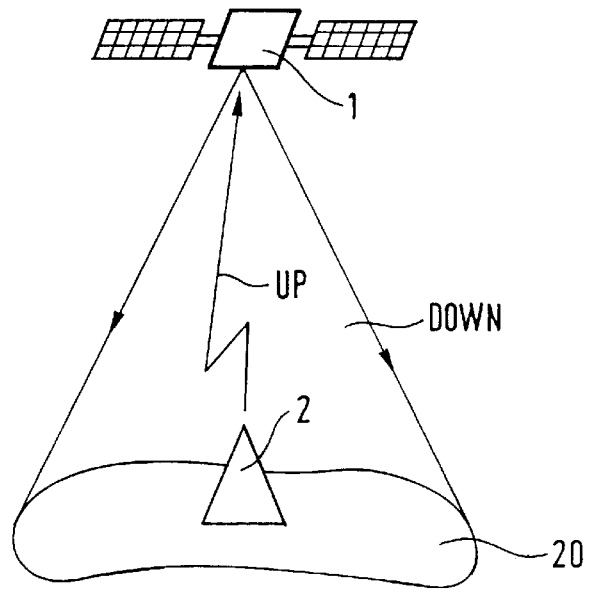
FIG. 1 already commented on, shows a satellite system.
Figure 2:
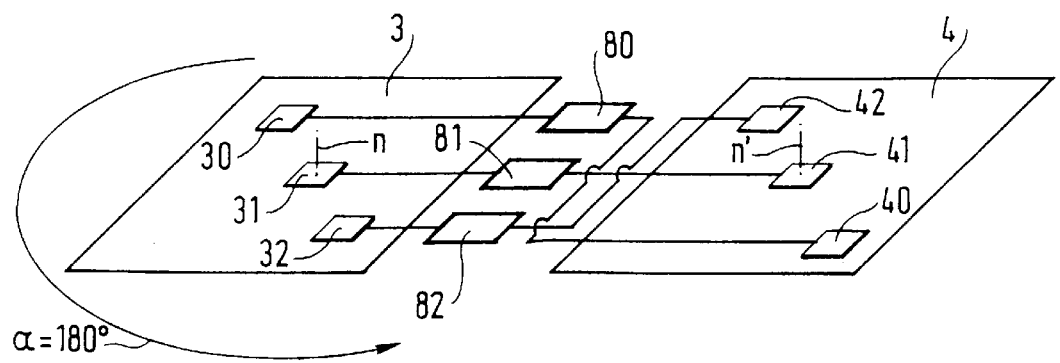
FIG. 2 is a representation of a transmission relay system constituting a first embodiment of the invention.

Referring to FIG. 2, a first transmission relay system of the invention comprises a plane receive antenna 3 provided with a plurality of first radiating elements 30, 31 and 32 and a plane transmit antenna 4 provided with a plurality of second radiating elements 40, 41 and 42, together with processing systems 80, 81 and 82 through which the first radiating elements 30, 31 and 32 and the second radiating elements 40, 41 and 42 are connected. As can be seen in this figure, each processing system 80, 81 and 82 connects a respective given first radiating element 30, 31 or 32 to a respective given second radiating element 40, 41 or 42. In accordance with the invention, the given second radiating element 40, 41 or 42 has an angular position in the transmit antenna 4 relative to a through axis of symmetry n' which is offset 180° relative to an angular position of the corresponding given first radiating element 30, 31 or 32 relative to a through axis of symmetry n. Each through axis of symmetry n, n' is a normal axis of symmetry or of revolution of the antenna concerned. Moreover, the given second radiating element 40, 41, 42 has an eccentricity relative to a mid-point of the transmit antenna 4 which is a function of an eccentricity of the given first radiating element 30, 31, 32 in the receive antenna 3. The greater the eccentricity of the first radiating element 30, 31, 32 in the receive antenna, the greater is the eccentricity of the corresponding second radiating element 40, 41, 42 in the transmit antenna. For example, the radiating element 30 situated in the top lefthand part of the receive antenna 3 is connected via the processing system 80 to the radiating element 40 situated in the bottom righthand part of the transmit antenna 4. All the processing systems 80–82 have the same electrical length and consequently induce propagation time-delays that are equal regardless of the frequency of the signal. As a result, the receive phase-shift between two radiating elements 30, 31 or 32 of the receive antenna is maintained on transmission between two corresponding radiating elements 40, 41 or 42 of the transmit antenna 4. A consequence of this is that a wavefront received at a given angle by the receive antenna 3 will be retransmitted at the same angle in the opposite direction by the transmit antenna 4.

Figure 4:
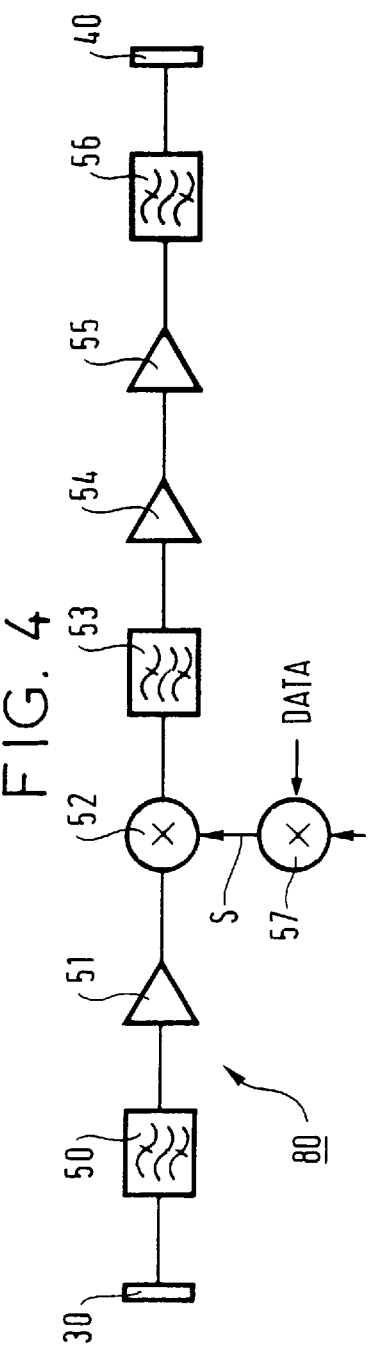
FIG. 4 is a block diagram of one of a plurality of processing systems included in the relay system of the invention.

As shown in FIG. 4, a processing system 80, 81 or 82 connecting a first radiating element 30 to a second radiating element 40 comprises in cascade, in an embodiment given by way of example, an input filter 50, a low-noise amplifier (LNA) 51, a frequency converter 52, a band rejection filter 53, a pre-amplifier 54, a solid state power amplifier (SSPA) 55 and an output filter 56. The frequency converter 52 transposes the frequency of the signal received via the antenna 3 to the frequency of the signal transmitted via the antenna 4 to prevent interference between the receive beam and the transmit beam.

Figure 3:
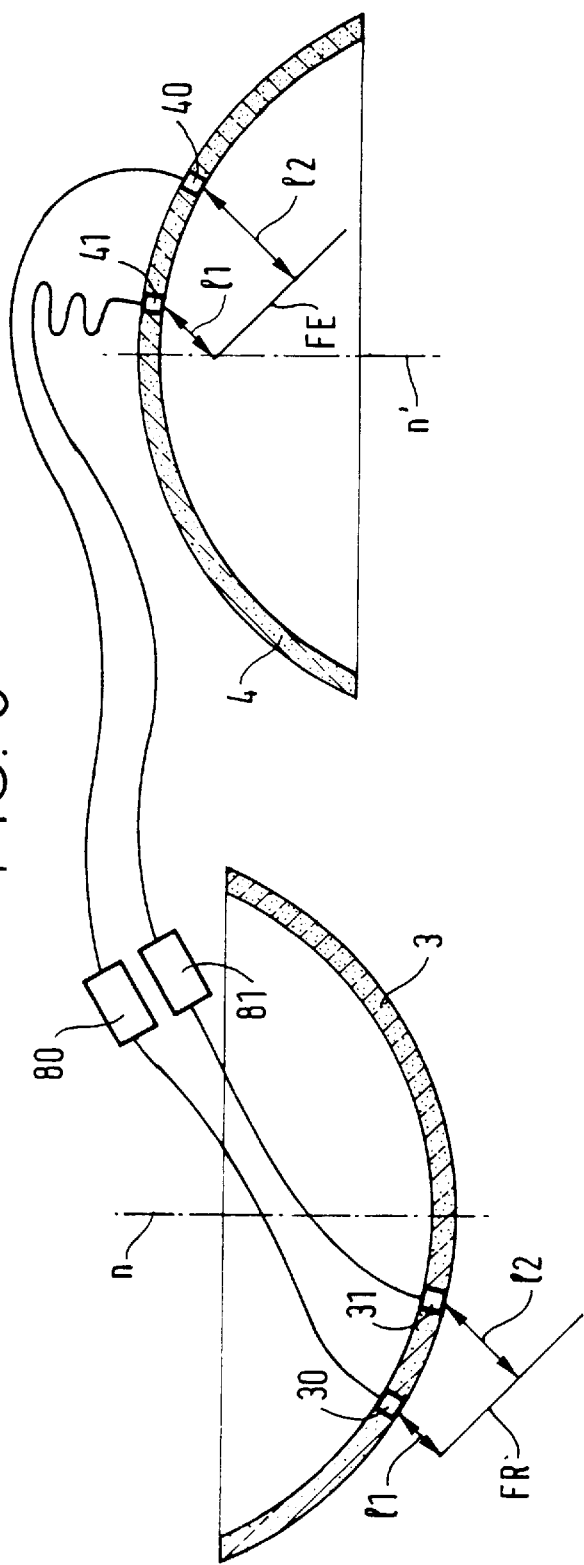
FIG. 3 shows a transmission relay system constituting a second embodiment of the invention.

In a second embodiment of the invention shown in FIG. 3 the receive antenna 3 and the transmit antenna 4 define portions of spherical surfaces, i.e. spherical domes, that are respectively convex and concave. As in the previous embodiment, a given second radiating element 40, 41 has an angular position in the transmit antenna 4 that is offset 180° relative to an angular position of the corresponding given first radiating element 30, 31 in the receive antenna 3. An angular position of a radiating element in an antenna is defined relative to a through axis of symmetry specific to that antenna. Similarly, the given second radiating elements 40, 41 have a eccentricity in the transmit antenna 4 which is a function of an eccentricity of the given first radiating element 30, 31 in the receive antenna 3. In one example, as a result of the combination of these two features, an eccentric radiating element of the receive antenna 3 situated on the left of the receive antenna 3 is connected to a radiating element of the eccentric transmit antenna 4 situated on the right of the transmit antenna 4. FIG. 3 shows that a signal carried by a wavefront FR received at a given angle by the receive antenna 3 is re-transmitted by the transmit antenna 4 in the form of a wavefront FE at the same angle but in the opposite direction.

Note that in all the embodiments described here the respective geometries of the transmit antenna 4 and the receive antenna 3 are deduced from each other by geometrical similarity relative to a point, the ratio of similarity being a function of the transmit frequency/receive frequency ratio, the difference between these two frequencies resulting from the frequency transposition, i.e. conversion, by the circuit 52. The geometrical similarity is such that the respective through axes of symmetry n, n' of the transmit and receive antennas are parallel. This guarantees transmission by the antenna 4 in a direction exactly opposite to that of reception by the antenna 3. The electrical paths of the N=2 processing systems 80, 81 being the same, a wavefront FR of the beam received by the receive antenna 3 is re-transmitted by the transmit antenna 4 in the form of a wavefront in the exact opposite direction. The geometry of the transmit and receive antennas in FIG. 4 is defined in the following manner. The aperture diameter and the radius of curvature of these antennas are adapted to suit the field of view to be covered and the size of the footprint of the beam on the ground required for the beam radiated by the antenna 4.

Figure 5:
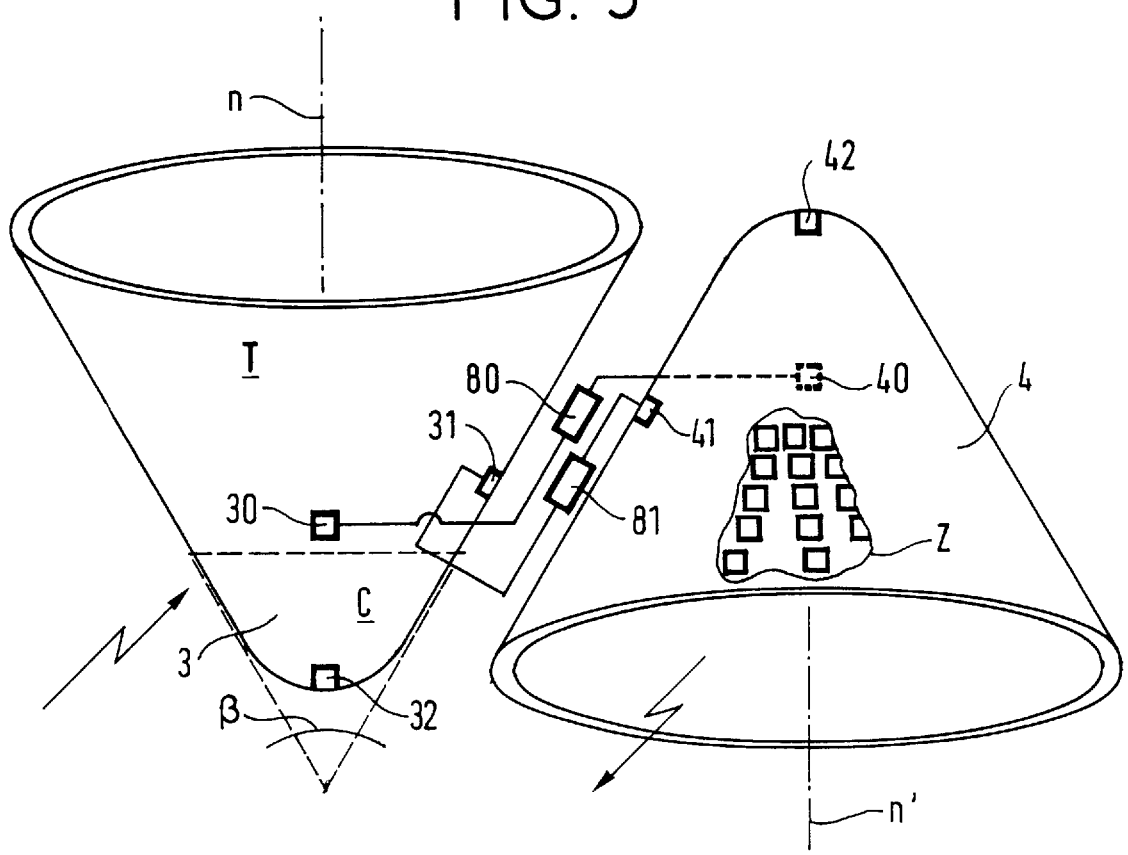
FIG. 5 is a representation of a transmission relay system constituting a third embodiment of the invention.

FIG. 5 shows another embodiment of the invention in which the receive antenna 3 and the transmit antenna 4 each define a circular hyperboloid which is asymptotic to a cone having a half-angle ($\beta/2$) typically between 25° and 35°. The patches of the receive antenna 3 are carried by the exterior surface of the hyperboloid 3 and the patches of the transmit antenna 4 are carried by the inside surface of the hyperboloid 4. Each circular hyperboloid includes a conic frustum T and an apex C. As in the previous embodiment, a second transmit radiating element 40, 41 has an angular position offset substantially 180° relative to an angular position of a corresponding first receive radiating element 30, 31. Furthermore, this second transmit radiating element 40, 41 has an eccentricity which is a function of the eccentricity of the corresponding first radiating element. In an embodiment of this kind the effective section of the antenna, defining the power received from the antenna for a given angle, decreases in the direction towards the nadir. This is because the conic frustum T of the circular hyperboloid, steeply inclined, contributes less and less to the radiation diagram in the direction towards the nadir. In a satellite application this guarantees a substantially constant gain over a relatively large area on the ground, given that points far from the nadir are at a greater distance from the satellite. Because of the large contribution of the radiating elements situated on the conic frustum T of the hyperboloid to the radiation diagram for angles defined by the normal to the surface of the conic frustum T, it can in practise be particularly advantageous to reduce the density of the radiating elements over at least a portion of the conic frustum in the direction away from the smaller base of the conic frustum T, or from the apex C towards the greater base of the conic frustum T, as shown by the area Z on the transmit antenna 4. In one embodiment given by way of example, letting H denote the height of the circular hyperboloid, the density of the radiating elements decreases regularly from the height H/2 to the larger base of the cone, the ratio of the density of the radiating elements between the height H/2 and the larger base being between 3 and 4. This solution is directed to reducing secondary lobes appearing in the radiation diagram and preventing asymmetry of the radiation diagram. The result is an elliptical radiation diagram.

Note that an active transmit and/or receive antenna structure using the circular hyperboloid geometry shown in FIG. 5 can also be used with advantage in a conventional active antenna transmission relay unit.

Figure 6:
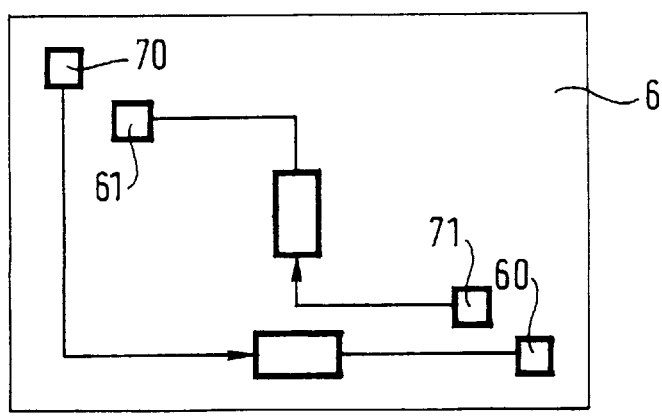
FIG. 6 is a representation of a transmission relay system constituting a fourth embodiment of the invention.

In a further embodiment shown in FIG. 6 the first and second radiating elements 70, 61, 71, and 61, respectively, of the transmit and receive antennas can be carried by the same surface 6 in a given alternating arrangement. As in the previous embodiments, a second receive radiating element has an angular position offset substantially 180° relative to an angular position of a corresponding first receive radiating element and an eccentricity which is a function of an eccentricity of this corresponding first radiating element. Various patterns can be defined in practise, such as a rectangular matrix in which a first radiating element and then a second radiating element are disposed successively in rows and columns.

Referring again to FIG. 4, in all the above embodiments the transposition signal S can be modulated by a wanted data signal DATA. This wanted data by a second frequency converter 57 signal DATA is stored in digital form in a memory on the satellite, for example. It comprises an image obtained by an imaging device on the satellite, for example. In this case, for example, a pure carrier frequency not modulated by any first signal is transmitted by the base station 2 which receives in return the wanted data signal DATA modulated by another carrier frequency.

The invention described hereinabove is not limited to satellite applications and can be used in any type of transmission relay. The skilled person will further understand that the particular means referred to in the above description can be replaced by any equivalent means without departing from the scope of the invention. For example, the radiating elements can be replaced by any equivalent means whose function is to produce/receive radiation individually.

There is claimed:

1. A transmission relay system comprising:

a receive antenna provided with a plurality of first radiating elements;

a transmit antenna provided with a plurality of second radiating elements; and a plurality of processors through which said first radiating elements and said second radiating elements are connected, wherein said processors are in the form of processing systems all of which induce the same propagation time-delay, each system connecting a given first radiating element to a corresponding given second radiating element defined by an angular position relative to a second through axis of symmetry specific to said transmit antenna which is offset substantially 180° relative to an angular position of said given first radiating element relative to a first through axis of symmetry specific to said receive antenna and parallel to said second through axis of symmetry and by an eccentricity in said transmit antenna which is a function of an eccentricity of said given first radiating element in said receive antenna.

2. The system claimed in claim 1 wherein said processing systems include frequency converters.

3. The system claimed in claim 2 wherein said frequency converters receive a transport signal modulated by wanted data.

4. The system claimed in claim 1 wherein said transmit antenna and said receive antenna define respectively convex and concave part-spherical surfaces.

5. The system claimed in claim 1 wherein said transmit antenna and said receive antenna define respectively convex and concave hyperboloidal surfaces.

6. The system claimed in claim 5 wherein a radiating element density decreases over at least a portion of at least one of said hyperboloidal surfaces in a direction away from an apex.

7. The system claimed in claim 1 wherein said transmit antenna and said receive antenna define respectively convex and concave part-spherical surfaces and said surfaces defining said transmit antenna and said receive antenna are deduced from each other by geometrical similarity relative to a point with a ratio of similarity which is a function of the transmit frequency/receive frequency ratio.

8. The system claimed in claim 2 wherein said transmit antenna and said receive antenna define respectively convex and concave hyperboloidal surface and said surfaces defining said transmit antenna and said receive antenna are deduced from each other by geometrical similarity relative to a point with a ratio of similarity which is a function of the transmit frequency/receive frequency ratio.

9. The system claimed in claim 2 wherein said transmit antenna means and said receive antenna define respectively convex and concave hyperboloidal surfaces wherein a radiating element density decreases over at least a portion of at least one of said hyperboloidal surfaces in a direction away from an apex and wherein said surfaces defining said transmit antenna means and said receive antenna are deduced from each other by geometrical similarity relative to a point with a ratio of similarity which is a function of the transmit frequency/receive frequency ratio.

10. The system as claimed in claim 1 wherein said second radiating element of said transmit antenna and said first radiating element of said receive antenna are supported by a common surface in a given alternating arrangement.

11. The system of claim 1 wherein said system is a satellite system.

12. The system of claim 1, wherein an electrical path between the first radiating elements and the second radiating elements are equal.

13. The system of claim 1, wherein a wavefront received at a given angle by the receive antenna is retransmitted at the same angle in the opposite direction by the transmit antenna.

* * * * *